Aug. 25, 1942.　　　J. W. WHITE　　　2,294,351
FLUID PRESSURE CREATING DEVICE
Filed June 10, 1938　　　4 Sheets-Sheet 1

INVENTOR.
JOHN W. WHITE
BY Jerome R. Cox
ATTORNEY.

Aug. 25, 1942. J. W. WHITE 2,294,351
FLUID PRESSURE CREATING DEVICE
Filed June 10, 1938 4 Sheets-Sheet 3

INVENTOR.
JOHN W. WHITE
BY Jerome A. Cox.
ATTORNEY.

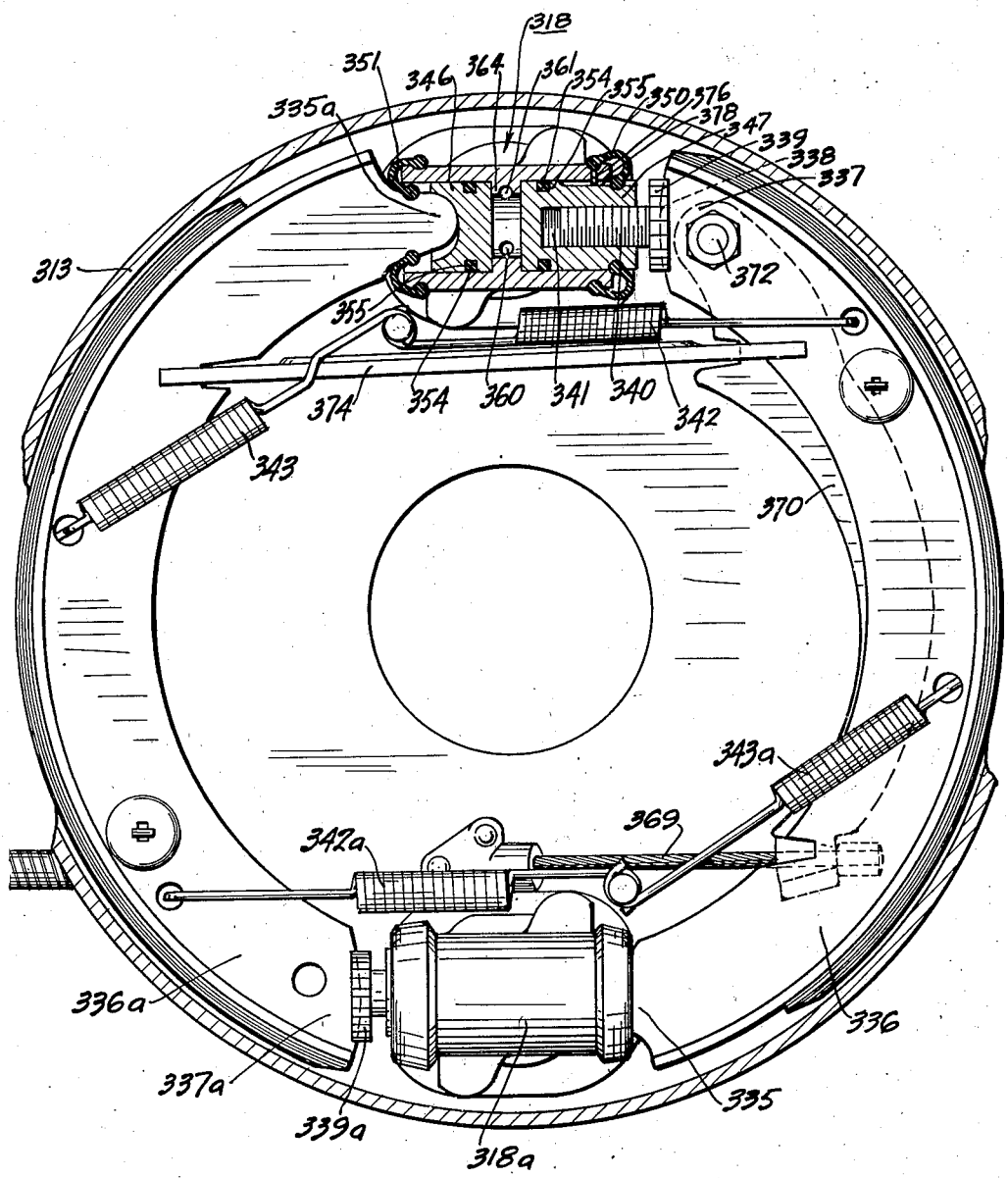

Patented Aug. 25, 1942

2,294,351

UNITED STATES PATENT OFFICE 2,294,351

FLUID PRESSURE CREATING DEVICE

John W. White, South Bend, Ind., assignor to Bendix Products Corporation, South Bend, Ind., a corporation of Indiana Application June 10, 1938, Serial No. 212,868

4 Claims. (Cl. 60—54.6)

This invention relates to braking systems of the fluid pressure type.

One object of the invention is to provide a fluid pressure braking system for a vehicle adapted to be manually controlled from the exterior of the vehicle of the type disclosed in the copending application Serial No. 211,554 filed jointly by applicant and William Stelzer (issued as Patent No. 2,274,021).

Another object of the invention is to provide the braking system with a novel fluid pressure producing device so constructed as to compensate for any expansion or contraction of fluid when the system is operating and so as to obviate the danger of bursting conduits due to variations in temperature.

A further object of the invention is to provide a novel vertical master cylinder having a compensating port slightly ahead of the piston head when the piston is in its fully retracted position and a valve controlled auxiliary chamber acting as an auxiliary supply port.

Although other uses are apparent I have shown my invention as embodied with a mine car. The speed of a mine car, loaded or unloaded, is low enough so that the miner may walk along his car and either retard the speed somewhat when coming to a curve or slope by partial application of the lever or stop the car completely by maximum application of the lever.

Since for all practical purposes the temperature within a mine is nearly constant there is little danger that the conduits may burst due to expansion of the fluid during a prolonged application of the system.

A still further object of the invention is to provide a novel wheel cylinder for the braking system having two oppositely acting pistons therein, adapted to give a longer stroke than has heretofore been obtained.

Another object of the invention is to provide a wheel cylinder for the braking system having means such as a plate at its inner periphery to limit the travel of the retracting pistons so that they will not overrun their respective chambers.

Since the wheels of a mine car are loosely journaled, there will be some "play" or free movement when a curve is being rounded. To compensate for this loose movement my wheel cylinder is provided having a longer stroke capable of setting the retarding mechanism sufficiently without any brake slipping due to such movement.

Other objects and desirable particular constructions and arrangements of parts will become apparent upon reference to the following detailed description of the several illustrative embodiments, shown in the accompanying drawings, in which:

Figure 7 is a view partly in section illustrating a modified form of my novel master cylinder; and Figure 8 is a view in vertical section showing a modified wheel brake structure and modified wheel cylinder.

Figure 1:
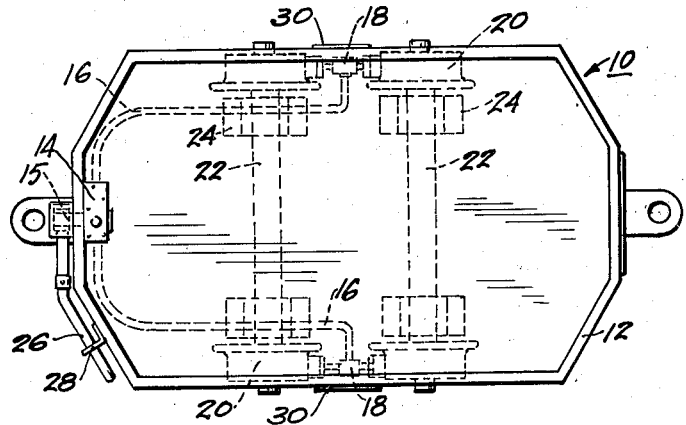
Figure 1 is a top plan view of a mine car showing diagrammatically the braking system and its operating mechanism.

Referring now to the drawings for a more detailed description, my invention is shown in Figure 1 as being incorporated with a mine car indicated generally by the numeral 10. The car 10 has a body 12 having parallel sides and outwardly stamped front and rear portions. Suitably secured to the inner front portion of the body 12 is the vertical master cylinder 14 having discharge conduits 16 communicating with wheel cylinders 18. The master cylinder also carries a forwardly extending shaft 15 which extends through the front portion of the body and which has suitably connected thereto the actuating lever 26 travelling within a notched guide member 28.

The car 10 is provided with wheels 20 having shafts 22 supported within journals 24 secured to the bottom of the car. Suitably fastened to the mine car between the wheels are depending flanges 30 (see Figure 4) having inwardly bent portions 32. The wheel cylinders 18 are supported by and secured to these bent portions by means such as bolts 34.

The wheel cylinders 18 have oppositely acting push-rods 36 operatively connected to the brake shoes 38. The shoes are pivotally supported on the mine car by means such as links 40 and the latter are connected by retractile springs 42 having sufficient force to urge the shoes to their normal position after applying force is released. To compensate for the wear of the brake shoes the push-rods 36 are provided with adjusting nuts 44. Turning these nuts forces the shoes outwardly to compensate for the surface recession.

Figure 2:
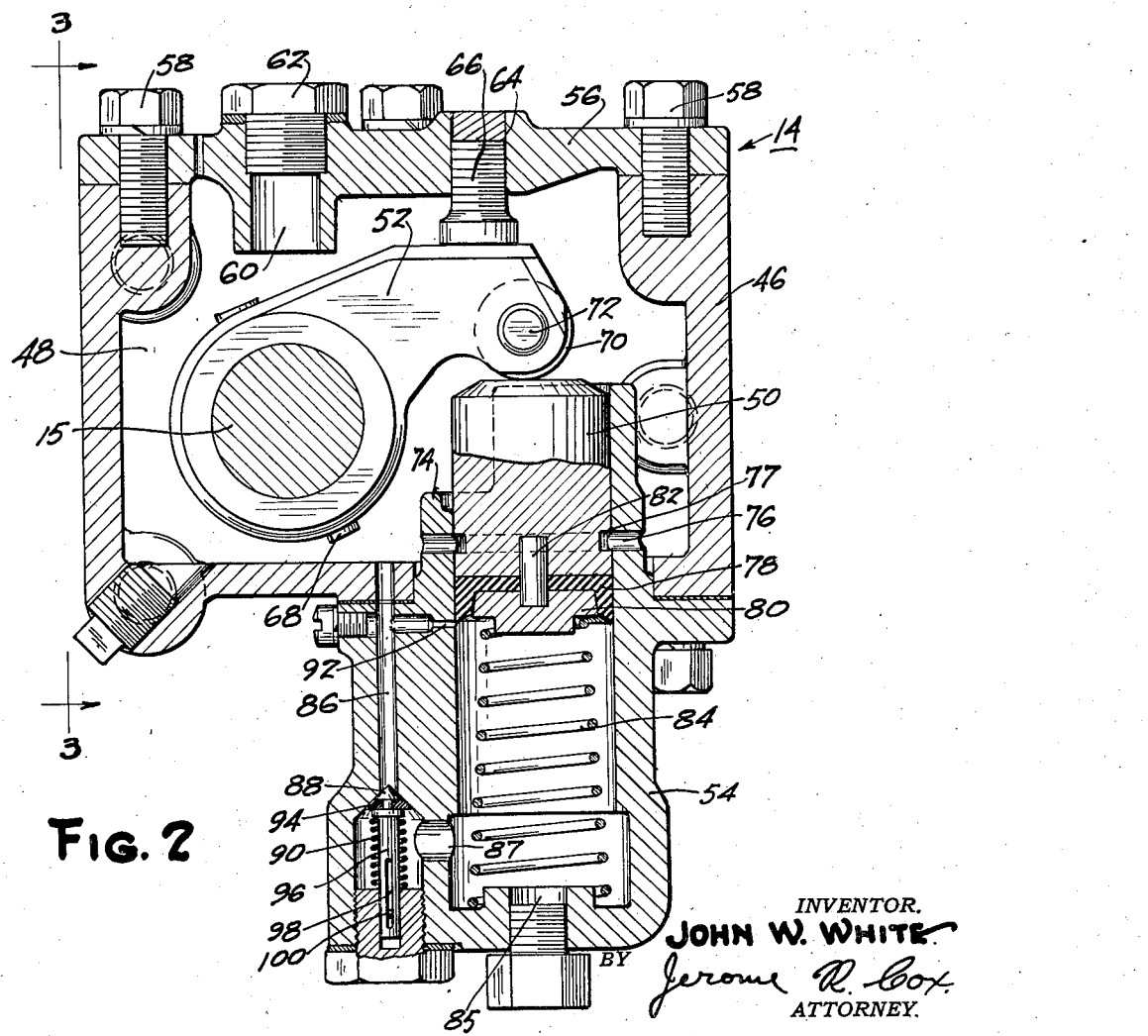
Figure 2 is a view in vertical section taken substantially through the center of a vertical master cylinder constructed according to my invention.

The preferred form of master cylinder according to my invention is illustrated in Figure 2 and is indicated generally by the numeral 14. It has a body 46 forming a fluid reservoir 48, a piston 50, an actuating crank 52 secured to the shaft 15, and an appended cylinder 54 secured thereto.

A removable cover plate 56 is secured to the fluid reservoir 48 by means such as bolts 58, and is provided with a filling passage bore 60 receiving the plug 62. Another bore 64 is also provided in the cover plate 56 which has an adjustable stud 66 arranged to predetermine the return travel of the actuating crank 52 and the resultant release position of the piston 50. When properly set the remainder of the bore above the stud is filled with lead or other molten metal so as to prevent any tampering with the adjustment. The actuating crank 52 is secured to the extending shaft 15 by means such as a bolt 68 and has its free end slotted so as to receive a roller 70 held within the slot by means such as a pin 72. The roller contacts the piston 50 and serves to distribute the force and minimize the friction on the piston end as the crank moves forcing the piston downwardly.

The upper portion of the appended cylinder 54 is formed with a grooved section 74 so as to permit the downward movement of the crank 52 within it as it acts upon the piston. Formed in the cylinder 54 slightly below the grooved section 74 is a passage 76 by which the interior of the cylinder communicates with the fluid reservoir. The passage cooperates with a peripheral groove 77 in the piston when the latter is in its retracted position so as to provide a lubricating system for the piston and the cylinder.

The head or lower end of the piston 50 is fitted with a rubber cup 78 retained by a metallic head 80, both being secured to the piston by means of a master pin 82. The rubber cup is formed so that on the downward stroke the lips thereof spread against the cylinder walls prohibiting fluid return. A light spring 84 rests on the metallic head 80 at one end and on the lower end of the cylinder at the other. The lower end of the cylinder 54 is formed with a discharge port 85.

Figure 3:
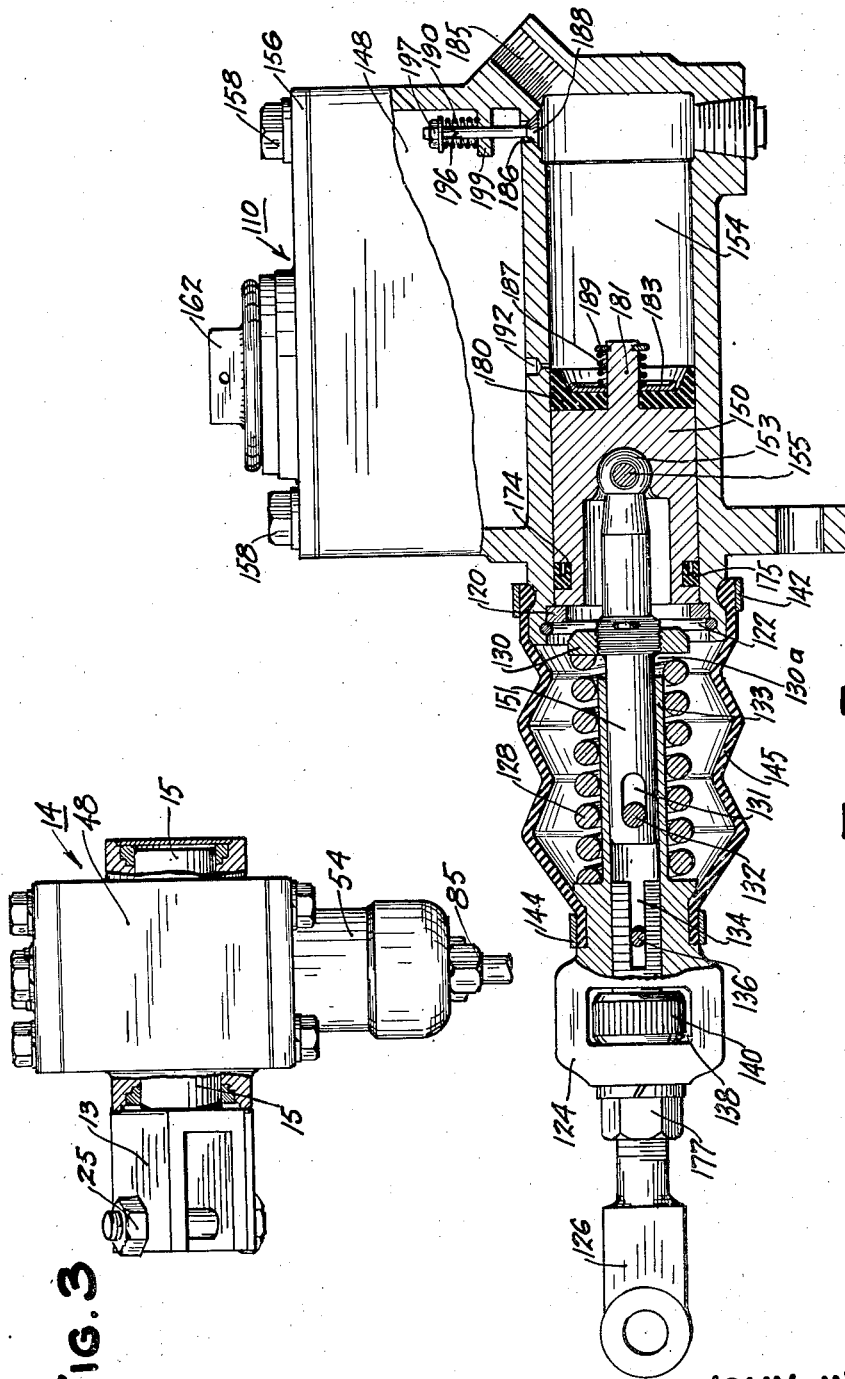
Figure 3 is a view in side elevation of the vertical master cylinder of Figure 2, the view being taken substantially on the line 3—3 of Figure 2 and the cylinder being shown on a slightly reduced scale.

Formed through the lower plate of the fluid reservoir 46 and in the side wall of the cylinder 54 are supply passages 86 and 87 which communicate with the reservoir 48 and the cylinder 54 but are normally separated by a valve 88 held in closed position by means of the spring 90. The valve 88 is fitted with a rubber washer 94 and has a stem 96. The stem is formed with a longitudinal slot 98 through which there extends a pin 100 arranged with the valve from complete displacement upon a sudden vacuum. When vacuum occurs on the return stroke of the piston the valve is unseated and fluid is supplied to the cylinder by means of the passage 86. Communicating with the supply passage 86 and the cylinder 54 just ahead of the cup 78, when the latter is in its fully retracted position, is a compensating port 92 supplying fluid to the cylinder or by-passing fluid from the cylinder when fluid contraction or expansion occurs in the system. The vertical master cylinder 46 is shown on a slightly reduced scale in Figure 3. Therein is shown a U-shaped block 13 adapted to be secured to the lever 26 by means such as a bolt 25, the block 13 being also suitably secured to the free-end of the shaft 15.

Figure 4:
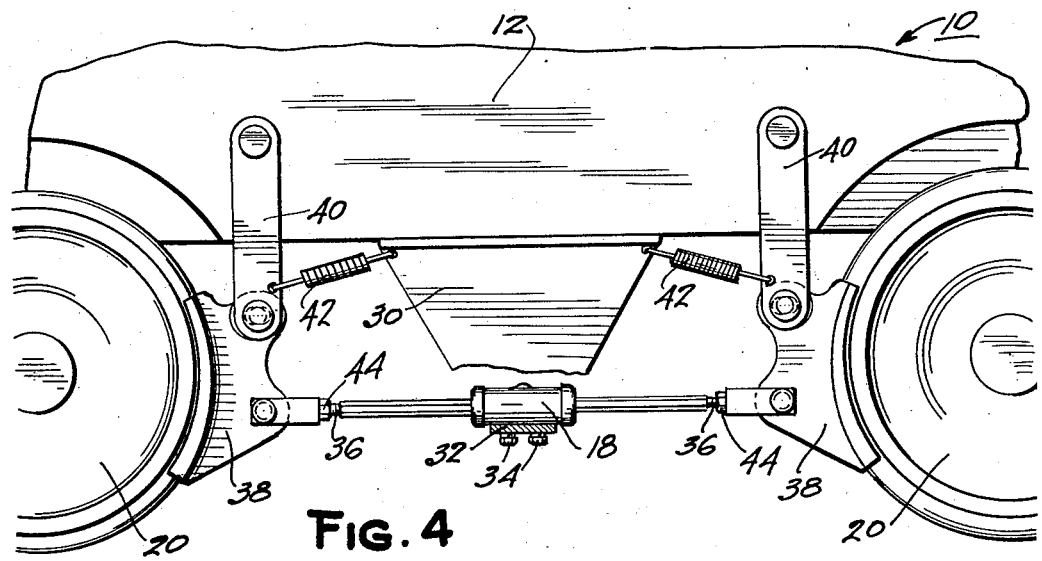
Figure 4 is a fragmentary view in side elevation of a portion of a mine car showing one of the wheel cylinders in their relation to the wheels.
Figure 5:
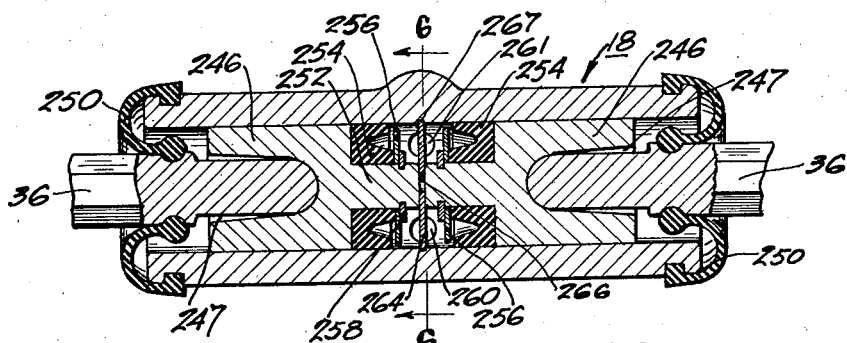
Figure 5 is a view in vertical section of one of my novel wheel cylinders.
Figure 6:
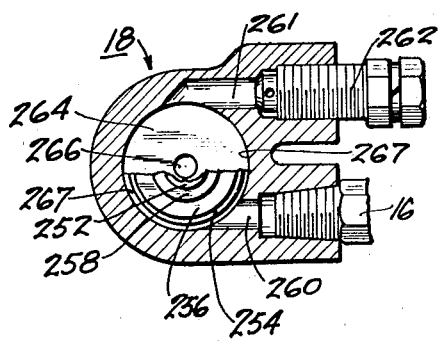
Figure 6 is another view of the wheel cylinder taken substantially on line 6—6 of Figure 5.

Referring now to Figures 4–6, there is shown one embodiment of my novel wheel cylinder. The wheel cylinder, indicated generally by the numeral 18, receives reciprocably therein oppositely acting pistons 246 operatively connected to push-rods 36, the push-rods extending into recesses 247 formed in the pistons. Suitably fastened to the wheel cylinders and to the push-rods 36 are flexible boots 250 arranged to keep out dirt and grit. The piston heads 246 are formed with inwardly extending decreased diameter portions 252 and have secured thereon sealing washers 254 adapted to distend against the cylinder walls upon the braking stroke of the pistons. To hold these rubber washers in place metallic washers 256 are provided, retained in place by a split-spring washer 258. An inlet port 260 connected with a conduit 16 communicates with the interior of cylinder along its vertical central axis. The cylinder also has a bleed port 261 controlled by a bleed screw 262.

I provide means to limit the inward travel of the pistons. A disk 264 having a central aperture 266 is seated in a groove 267 in the inner peripheral portion of the cylinder at its central vertical axis. The aperture 266 permits fluid communication with both of the piston heads. The disk 264 acts as a limiting member for the return travel of the pistons. Such an arrangement allows a greater stroke.

In operation as the lever 26 is actuated the shaft 15 rotates carrying the actuating crank 52. The crank contacts and forces the piston 50 downwardly in the cylinder 54. On the compression stroke the rubber cup 78 distends against the walls of the cylinder insuring a seal tight fit. The fluid is discharged through the port 85 into the conduits 16 and to the wheel cylinders 18. The pistons 246 actuate the push-rods 36 and move the brake shoes 38 against the surface of the wheels 20 retarding their rotation. Upon releasing of the brake the piston 50 is retracted and should any partial vacuum occur the difference in pressures unseat valve 88 and fluid is supplied to the cylinder through the passages 86—87. During such time the rubber cup 78 is prevented from complete displacement from the piston head by the spring 84.

A modification of the master cylinder of my invention is shown in Figure 7, and therein parts corresponding to parts shown in Figure 2 are designated by the same reference numeral increased by 100. It is to be understood that the actuating rod 126 is to be connected for actuation to a lever similar to lever 26 so arranged that it can be retained against release. In the modification, there is shown a horizontal master cylinder 110 having a fuel reservoir 148 and a cylinder proper 154 formed integrally with the reservoir. The top of the reservoir 148 is provided with a removable cover plate 156 secured thereto by means such as bolts 158. Also provided within the cover plate 156 is a filling opening fitted with a vented plug 162. Reciprocably mounted within the cylinder 154 is a piston 150, suitably secured to a piston rod 151 by means such as a ball-and-socket joint 153. A pin 155 passes through the joint. When the piston 150 is in its retracted position, its rear end rests against a hollow retaining washer 120 held in place by means such as a snap ring 122, seated in a groove in the inner periphery at the rear of the cylinder.

An adjusting member 124 having a longitudinal bore connects the actuating rod 126 and the piston rod 151. Against the member 124, there bears one end of a pre-loaded spring 128, the member having an enlarged diameter portion acting as a shoulder for said end of the spring. A nut 130 is threaded on the forward enlarged diameter portion of the piston rod 151 and acts as an abutment for the other end of the spring. The piston rod 151 is provided with a longitudinal slot 131, receiving a pin 132 which passes through a sleeve-like forward extension 133 of the member 124, and limits the separation of the member 124 from the piston rod 151. The spring 128 is sleeved about the extending portion 133 of the member 124, and is preloaded so as normally to tend to separate the member 124 and the nut 130 to form a clearance 130a between said member 124 and the nut 130. The purpose of such clearance will appear more fully hereinafter. Within a recess 138 in the member 124 there is an adjusting nut 140 threaded on the actuating rod 126 for adjusting the position of the member 124 relative to the rod 126. Rod 126 has a slot 134 within which a pin 136 secured in member 124 slides, thus preventing rotation between the members 124 and 126 but permitting longitudinal movement when said adjustment is being made. Secured, also, to the shoulder of the member 124 at one end and to the rear portion of the cylinder at its other end by means such as straps 142 and 144 is a flexible boot 145.

The head of the piston 150 is provided with a boss 181 having sleeved thereon a sealing cup 180. The cup 180 is urged against the piston head by means such as a retaining disk 183 held in place by a spring 187. The other end of spring 187 is seated against a split-spring washer 189, which seats in a grooved portion of a boss 181 formed on the piston 150. The rear of the piston is provided with a peripheral grooved portion 174 seating a sealing washer 175 which prevents fluid flow to the rear of the piston. A compensating port 192 communicates with the cylinder 154 slightly ahead of the cup 180 when the piston is in its fully retracted position. A supply port 186 communicates with the cylinder at its forward end and is controlled by a valve 188 having a stem 196. The stem passes through an abutment 199 and has a nut 197 threaded at its free end. Between the nut 197 and abutment 199 there is inserted a spring 190 which surrounds the valve stem, urges the valve 188 to its seat and thus closes the supply port 186.

The rear end of the member 124 is locked by a nut 177. By loosening the nut 177 and turning the nut 140, the actuating rod 126 may be adjusted as desired relative to the member 124 and the piston rod 151. The spring 128, being preloaded, its stored force equals or slightly exceeds the maximum force reacting on the piston head during normal operation of the brakes.

In the operation of the modified master cylinder 110, application of force to the rod 126 transmits force to the member 124. The member 124 transmits force to the rod 151 through the spring 128 and thus moves the piston 150 on its compression stroke. When it is desired to set the brakes over a period of time and to provide for expansion or contraction of fluid while the brakes are set during temperature variations, the brakes are applied until the spring 128 is partly compressed. Thereafter, if there is any expansion of fluid, the pressure at the head of the piston increases until the pre-loaded force of the spring 128 is reached. When this point is reached the piston retracts slightly taking up partly the clearance 153, thus preventing any danger of the conduits bursting when the brakes are in an applied position. On the other hand, if there is contraction of fluid the extension of the compressed spring 128 maintains the brakes applied.

In Figure 8, I have shown as a modification an internal expansion brake provided with a wheel cylinder constructed according to my invention. In that figure, shoes 336 and 336a are adapted to be moved into contact with a rotating brake drum 313 by wheel cylinders 318 and 318a. Depending on the direction of rotation of the drum, the shoes anchor separately through one end or the other on the wheel cylinders as will be later explained.

Each wheel cylinder 318 or 318a is provided with a pair of pistons 346 and 347. Each piston 346 and 347 is provided with a square-in-section sealing ring 354 set in a square-in-section groove 355, the groove being slightly wider than the ring but the ring being at least as thick as the groove is deep. Between the pistons 346 and 347, the cylinder is formed with a ridge or stop 364 against which the inner ends of the pistons abut. Inlet and bleed ports 360 and 361 are provided. In forward braking (drum moving counterclockwise) the end 337 of the shoe 336 anchors in a groove 338 formed in the head 339 of a bolt 340 threaded in a bore 341 formed in the piston 347. The end 337a similarly anchors on 339a. The shoe 336a is applied by the piston 346 acting on the end 335a of the shoe 336a. The shoe 336 is similarly applied by the corresponding piston of the cylinder 318a acting on the end 335 of said shoe 336.

In anchoring on reverse braking the shoes 336a and 336 anchor through ends 335a and 335 on piston 346 and the corresponding piston of cylinder 318a respectively. The stops 364 are arranged to take the anchoring load as well as arranged to position the piston and shoes when the brakes are released.

Dust caps 350 and 351 are provided and springs 342, 343, 342a and 343a are arranged to return the shoes to the released position shown and to control the initial brake application. The brakes may also be applied by mechanical means comprising a cable 369 connected to one end of a lever 370 pivoted on shoe 336 at 372 and acting through a strut link 374 on shoe 336a.

The brakes may be adjusted for wear by rotation of the serrated heads 339 of the bolts 340, thus unscrewing the bolts 340 in the bores 341 of the pistons 347, rotation of the piston during adjustment being prevented by pins 376 in slots 378.

While several illustrative embodiments have been described in detail, it is not my intention to limit the scope of the invention to those particular embodiments or otherwise than by the terms of the appended claims.

I claim:

1. A piston actuating means for a hydraulic cylinder comprising a longitudinally movable rod connected to the piston, an intermediate member sleeved about the rod and capable of limited longitudinal movement relative to the rod, a spring associated with the member and the rod for resiliently moving the rod and piston longitudinally in response to movement of the member, a manually operable element, and an adjusting nut screwed on the manually operable element and constraining the intermediate member to move longitudinally with the manually operable element.

2. A piston actuating means for a hydraulic cylinder comprising a longitudinally movable rod connected to the piston, a manually operable element not directly connected to the rod, an intermediate member sleeved about the rod and about the manually operable element and capable of limited longitudinal movement relative to the rod, a spring associated with the intermediate member and the rod for resiliently moving the rod and piston longitudinally in response to movement of the intermediate member, and an adjusting device movable during adjustment longitudinally along the manually operable element and contacting the intermediate member to constrain it to move longitudinally with the manually operable element.

3. A piston actuating means for a hydraulic cylinder comprising a longitudinally movable rod connected to the piston, an intermediate member sleeved about the rod and connected by a pin and slot to the rod, a spring associated with the member and the rod for resiliently moving the rod and piston longitudinally in response to movement of the member, a manually operable element, an adjusting nut screwed on the manually operable element and constraining the intermediate member to move longitudinally with the manually operable element, and locking means holding the adjusting nut and manually operable element in position after adjustment.

4. A piston actuating means for a hydraulic cylinder comprising a longitudinally movable rod connected to the piston, an intermediate member sleeved about the rod and capable of limited longitudinal movement relative to the rod, a spring associated with the member and the rod for resiliently moving the rod and piston longitudinally in response to movement of the member, a manually operable element, a device adjustable longitudinally of the manually operable element and constraining the intermediate member to move longitudinally with the manually operable element, and a plurality of means for preventing rotation of the intermediate member relative to either the rod or the manually operable element.

JOHN W. WHITE.